UNITED STATES PATENT OFFICE.

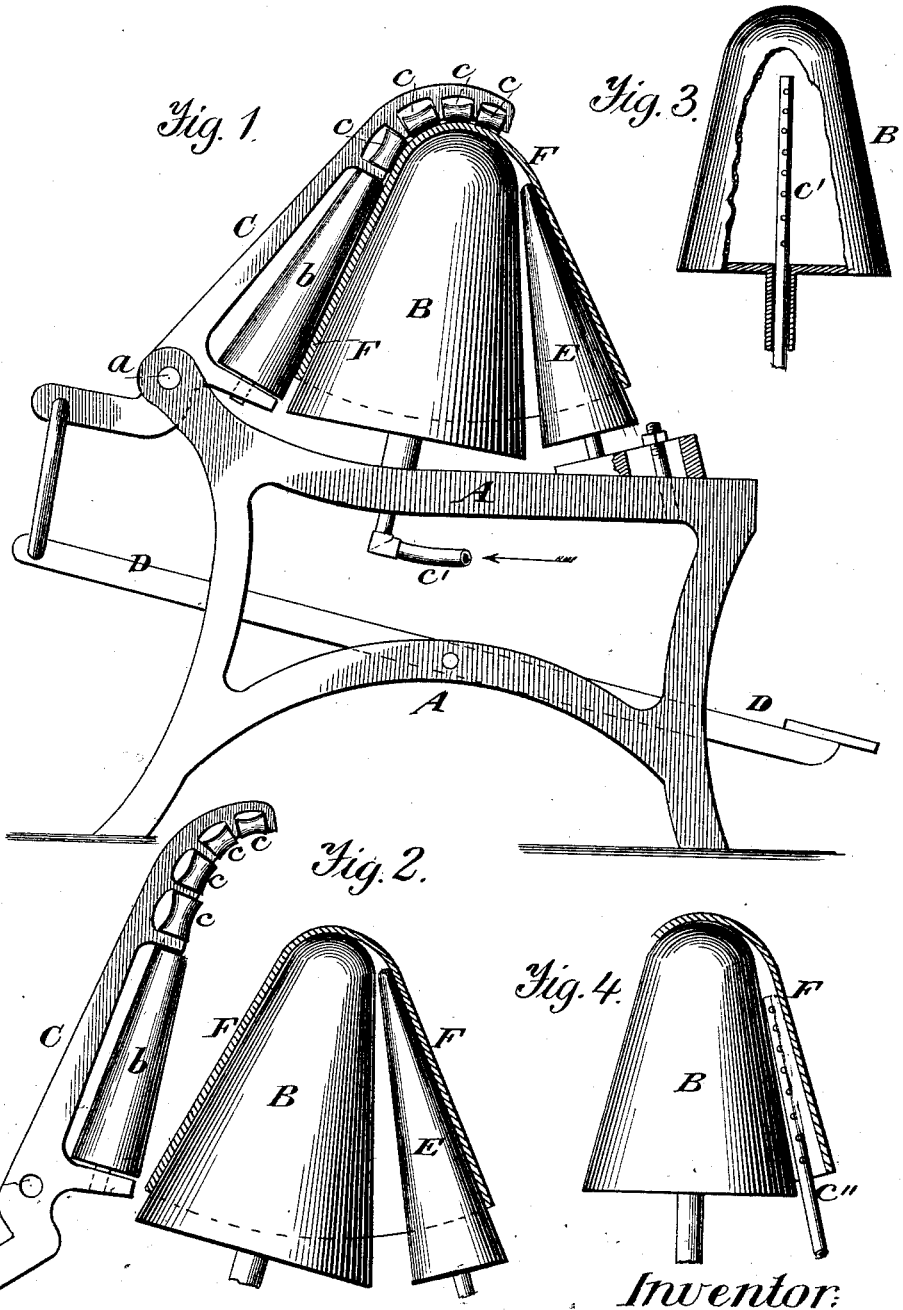

ABRAHAM T. CLASON, OF DANBURY, CONNECTICUT.

MACHINERY FOR FELTING, PLANKING, SIZING, &c., HATS.

SPECIFICATION forming part of Letters Patent No. 348,825, dated September 7, 1886.

Application filed March 22, 1886. Serial No. 196,173. (No model.)

*To all whom it may concern:*

Be it known that I, ABRAHAM T. CLASON, of Danbury, in the county of Fairfield and State of Connecticut, have invented certain new and useful Improvements in Machinery for Felting, Planking, Sizing, and Pinning Out Hats, of which the following is a specification, reference being had to the accompanying drawings, and to the letters of reference marked thereon.

This invention is an improvement upon that described in my Letters Patent No. 338,140, granted to me March 16, 1886, and is designed to increase the efficiency of the construction therein shown. By the machine described in my said former application all the functions of my present machine are not performed; neither are they described in the said application.

In the accompanying drawings, Figure 1 is a side elevation of a machine embodying my improvements. Fig. 2 shows a portion of the same machine with the working-rollers raised from the main cone. Fig. 3 shows a mode of carrying the heat to the interior of the cone. Fig. 4 shows a mode of carrying the heat between the cone and the hat.

A is the frame of the machine, upon which the main cone B is mounted so as to revolve.

C is an arm or lever pivoted to the main frame at $a$, and operated by a treadle, D. The arm or lever C supports the series of workers or rollers $b$ $c$, the rollers $c$ being concave or smaller at their centers, and curved over the spherical end of the cone. The series of workers $b$ $c$, being mounted in the arm C on a pivot at each end, are free to revolve, the rotation being effected by the frictional contact with the hat.

E is a conical roller mounted in the frame A. It is made to revolve, and also to be adjustable with reference to the main cone, and with it to work within the hat-body shown by F. The main cone B, as also the conical roller E, may be caused to revolve by any suitable means, or by the mechanism shown in my said pending application No. 122,127.

Steam is applied to the interior of the steam-tight main cone B by a pipe, $c'$, as shown in Fig. 3, or steam may be conveyed between the main cone and the hat by means of a perforated steam-pipe, $c''$, extending within the hat, as shown in Fig. 4.

It will be seen that by the use of the main cone B and conical roller E with the series of workers $b$ $c$ the two sides of the hat-body are simultaneously operated upon. The conical roller E may be made adjustable to suit different sizes of hats or to finish off hats having different flares or shapes.

The series of workers $b$ $c$ pin out the hats or press out the water, which is the last step in the process. This general feature is shown in my said pending application No. 122,127, but the workers are not there shown arranged upon an arm or lever, and not adapted to be raised from the main cone, as illustrated herein in Fig. 2; neither in said pending application are they specially mentioned or claimed as pinning-out rollers; neither are they there shown in connection with a smaller inner cone or conical roller, E, whereby both sides of the hat may be simultaneously manipulated.

The main cone, conical roller, and the workers may, if desired, be placed horizontally and used with a vat.

I disclaim the invention claimed in Patent No. 328,719, granted October 20, 1885, to T. Sanders.

Having described my invention, I claim—

1. In a machine for felting, planking, sizing, and pinning out hats, the combination of a main cone adapted to be heated and conforming to the shape of the hats, an adjustable conical roller, also to revolve within the hat, and a series of workers, $b$ $c$, the said workers $c$ being made to curve over the spherical end of the main cone, substantially as set forth.

2. In a machine for felting, planking, sizing, and pinning out hats, the combination of a cone adapted to be heated and conforming to the shape of the hats, a series of workers, $b$ $c$, mounted upon an arm or lever, the said workers $c$ being made to curve over the spherical end of the cone, and with the workers $b$ adapted to be lifted therefrom as a series, substantially as set forth.

3. In a machine for felting, planking, sizing, and pinning out hats, the combination of a cone adapted to be heated and conforming to the shape of the hats, a conical roller, also adapted to revolve within the hat, a series of workers, *b c*, mounted in an arm or lever, whereby they may be lifted from the main cone, the said workers *c* being made to curve over the spherical end of the cone, substantially as set forth.

4. In a hat-felting machine, a main cone conforming to the shape of the hats, combined with a perforated steam-pipe outside the cone and adapted to discharge steam between said cone and the hat, substantially as set forth.

In testimony whereof I hereunto set my hand and seal.

ABRAHAM T. CLASON. [L. S.]

Witnesses:
JAS. S. TAYLOR,
NORMAN HODGE.